(12) United States Patent
Kuboki et al.

(10) Patent No.: US 10,985,414 B2
(45) Date of Patent: Apr. 20, 2021

(54) POWER STORAGE DEVICE INCLUDING COOLING MEMBER WITH BULGING PORTION CAUSED BY EVAPORATION OF COOLANT

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Hideyuki Kuboki, Mie (JP); Hiroki Hirai, Mie (JP); Makoto Higashikozono, Mie (JP); Akihisa Hosoe, Osaka (JP); Yoshiyuki Hirose, Osaka (JP); Akihiro Nagafuchi, Osaka (JP); Tomoharu Takeyama, Osaka (JP); Eiichi Kobayashi, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 99 days.

(21) Appl. No.: 16/323,953

(22) PCT Filed: Jul. 28, 2017

(86) PCT No.: PCT/JP2017/027404
§ 371 (c)(1),
(2) Date: Feb. 7, 2019

(87) PCT Pub. No.: WO2018/034129
PCT Pub. Date: Feb. 22, 2018

(65) Prior Publication Data
US 2019/0214692 A1    Jul. 11, 2019

(30) Foreign Application Priority Data
Aug. 16, 2016   (JP) ............................... JP2016-159720

(51) Int. Cl.
*H01M 10/613* (2014.01)
*H01G 11/18* (2013.01)
(Continued)

(52) U.S. Cl.
CPC .......... *H01M 10/613* (2015.04); *H01G 11/10* (2013.01); *H01G 11/18* (2013.01);
(Continued)

(58) Field of Classification Search
CPC ............. H01M 10/613; H01M 10/625; H01M 10/655; H01M 10/6554; H01M 10/6556;
(Continued)

(56) References Cited

U.S. PATENT DOCUMENTS

2007/0292751 A1   12/2007   Cherng et al.
2012/0282506 A1   11/2012   Hohenthanner et al.
(Continued)

FOREIGN PATENT DOCUMENTS

JP   2010-211963 A   9/2010
JP   2012-114030 A   6/2012
(Continued)

OTHER PUBLICATIONS

Intenational Search Report in International Patent Application No. PCT/JP2017/027404, dated Sep. 5, 2017.

*Primary Examiner* — Sean P Cullen
(74) *Attorney, Agent, or Firm* — Greenblum & Bernstein, P.L.C.

(57) ABSTRACT

A power storage module includes: a plurality of power storage elements; a plurality of cooling members each of which has a coolant and a sealing body hermetically sealing (Continued)

the coolant, is stacked on the power storage element, and is configured to form a bulging portion by deformation of the sealing body caused by evaporation of the coolant at an extension portion extending in a region not overlapping the power storage element; and a heat transfer member that has a spacer portion disposed between the adjacent extension portions of the plurality of cooling members and configured to abut with the bulging portion.

4 Claims, 9 Drawing Sheets

(51) Int. Cl.
  *H01M 10/6569* (2014.01)
  *H01M 10/625* (2014.01)
  *H01M 10/6556* (2014.01)
  *H01M 50/20* (2021.01)
  *H01M 10/655* (2014.01)
  *H01M 10/6554* (2014.01)
  *H01M 10/6567* (2014.01)
  *H01G 11/10* (2013.01)
  *H01M 10/647* (2014.01)

(52) U.S. Cl.
  CPC ....... *H01M 10/625* (2015.04); *H01M 10/655* (2015.04); *H01M 10/6554* (2015.04); *H01M 10/6556* (2015.04); *H01M 10/6567* (2015.04); *H01M 10/6569* (2015.04); *H01M 50/20* (2021.01); *H01M 10/647* (2015.04); *Y02T 10/70* (2013.01)

(58) Field of Classification Search
  CPC ......... H01M 10/6567; H01M 10/6569; H01M 2/1077; H01G 11/10; H01G 11/18
  USPC ........................................................ 429/120
  See application file for complete search history.

(56) References Cited

U.S. PATENT DOCUMENTS

| | | | |
|---|---|---|---|
| 2014/0318746 A1 | 10/2014 | Kwak et al. | |
| 2018/0076494 A1* | 3/2018 | Kuboki | ................... F28D 15/02 |
| 2019/0181515 A1* | 6/2019 | Kuboki | ................... H01G 11/12 |
| 2019/0198950 A1* | 6/2019 | Kuboki | ............. H01M 10/6557 |

FOREIGN PATENT DOCUMENTS

| | | | | |
|---|---|---|---|---|
| JP | 2012204129 A | * | 10/2012 | |
| JP | 2013-504147 A | | 2/2013 | |
| JP | 2014-56690 A | | 3/2014 | |
| JP | 2014-216313 A | | 11/2014 | |
| JP | 2015-106527 A | | 6/2015 | |
| JP | 2017103109 A | * | 6/2017 | ........ H01M 10/6567 |

* cited by examiner

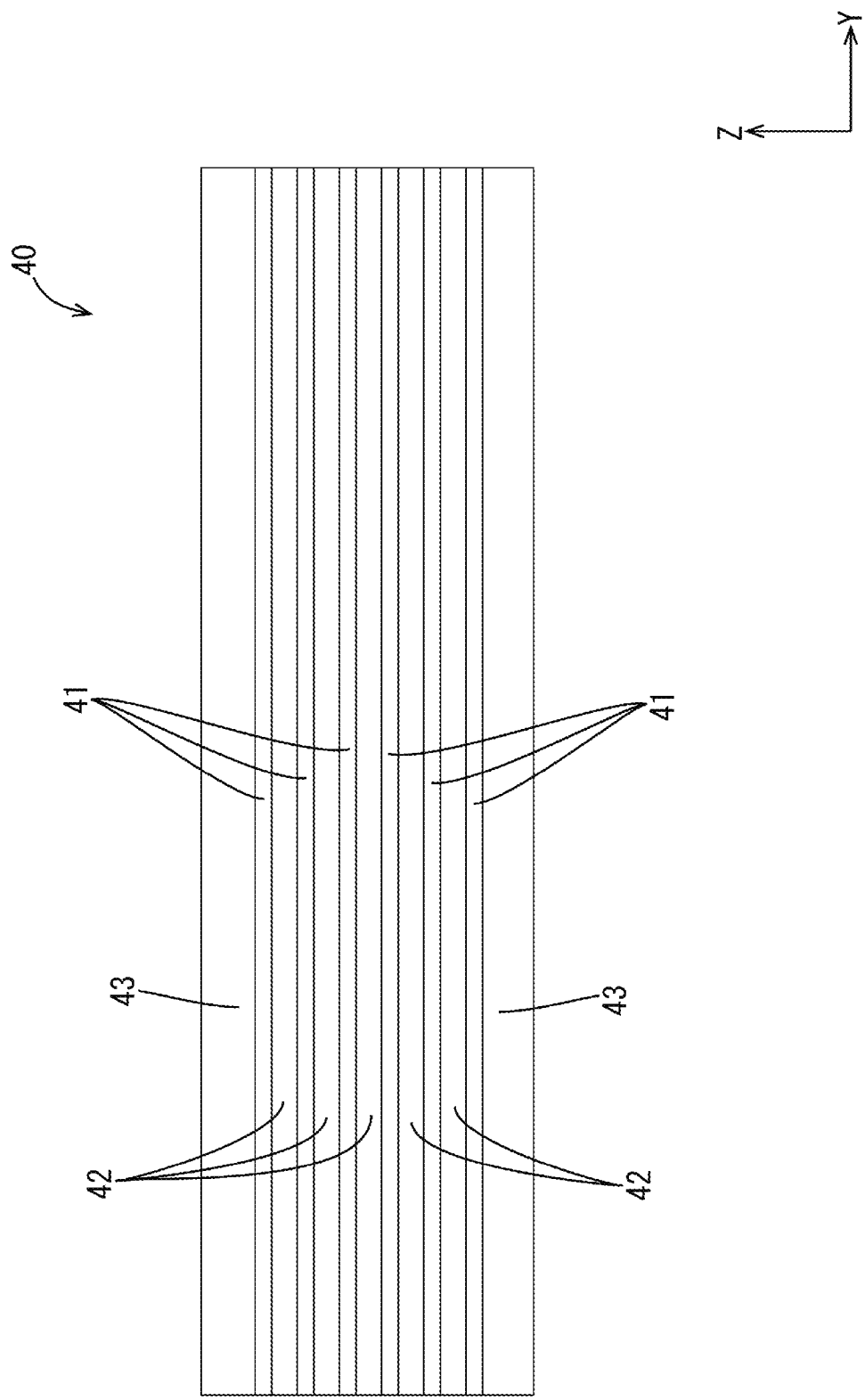

POWER STORAGE DEVICE INCLUDING COOLING MEMBER WITH BULGING PORTION CAUSED BY EVAPORATION OF COOLANT

TECHNICAL FIELD

The present description discloses a technique for dissipating heat from a power storage element.

BACKGROUND ART

There has been conventionally known a technique for dissipating heat from a power storage element. Patent Document 1 describes that a battery module is stored in a pack case and positive terminals and negative terminals of a plurality of cells are electrically connected together via bus bars. When a coolant charged in the lower portion of the pack case becomes evaporated and condensed in the upper portion of the pack case, heat of the battery is dissipated to the outside.

RELATED ART DOCUMENT

Patent Document

Patent Document 1: Japanese Unexamined Patent Application Publication No. 2010-211963

DISCLOSURE OF THE PRESENT INVENTION

Problem to be Solved by the Invention

According to the technique described in Patent Document 1, the coolant is to be evaporated and condensed in the pack case, and thus the entire pack case needs to be sealed. This causes a problem that it is not easy to simplify the configuration of the power storage module.

The technique disclosed herein is completed under the foregoing circumstances, and an object of the technique is to simplify the configuration of the power storage module.

Means for Solving the Problem

A power storage module described herein includes: a plurality of power storage elements; a plurality of cooling members each of which has a coolant and a sealing body hermetically sealing the coolant, is stacked on the power storage elements, and is configured to form a bulging portion by deformation of the sealing body caused by evaporation of the coolant at an extension portion extending in a region not overlapping the power storage element; and a heat transfer member that has a spacer portion disposed between the adjacent extension portions of the plurality of cooling members and configured to abut with the bulging portion.

According to the foregoing configuration, it is possible to dissipate heat from the power storage elements via the cooling members in which the coolant is sealed in the sealing body and the heat transfer member. Accordingly, as compared to the configuration in which the coolant is charged in a case where the power storage elements are stored, for example, the case does not necessarily need to be sealed. This makes it possible to simplify the configuration of the power storage module. When the bulging portion formed by the bulging and deformation of the sealing body in the cooling member is disposed in a space with low heat conductivity (air), there is caused a problem of poor heat dissipation property of the bulging portion.

According to the present configuration, the spacer portion disposed between the adjacent extension portions of the plurality of cooling members abuts with the bulging portion, and thus the heat of the power storage elements is transmitted from the cooling members to the heat transfer member to allow heat dissipation to the outside via the heat transfer member, thereby achieving improvement in heat dissipation property.

Embodiments of the technique described herein are preferably as described below.

The heat transfer member may have a plurality of the spacer portions aligned, and the bulging portion may be disposed between the adjacent spacer portions.

Accordingly, the bulging portion easily adheres to the spacer portions, thereby to improve heat conductivity between the cooling member and the heat transfer member.

Out of the plurality of spacer portions, the spacer portions at ends in an alignment direction may have overhanging portions hanging over outward on outer surfaces thereof.

This allows heat dissipation via the overhanging portions of the heat transfer member, thereby to improve heat dissipation property.

The heat transfer member may include a coupling portion that couples the plurality of spacer portions, and a surface of the coupling portion may contact a surface of an external heat dissipation member.

Accordingly, it is possible to improve heat conductivity from the heat transfer member to the heat dissipation member, thereby to improve heat dissipation property.

The power storage module may further include a heat equalization plate that is stacked on the power storage element with the cooling member therebetween. The heat equalization plate may include a heat equalization extension portion that is extended to the heat transfer member side in the region not overlapping the power storage element.

Accordingly, the heat conductivity to the heat transfer member can be improved by the heat equalization extension portion of the heat equalization plate.

Advantageous Effect of the Invention

According to the technique described herein, it is possible to simplify the configuration of the power storage module.

BRIEF DESCRIPTION OF THE DRAWINGS

FIG. 9 is a left side view of the heat transfer member.

MODES FOR CARRYING OUT THE INVENTION

First Embodiment

A first embodiment will be described with reference to FIGS. 1 to 9. A power storage module 10 in the present embodiment is mounted in a vehicle such as an electric car or a hybrid car, for example, to supply electric power to a load such as a motor. Although the power storage module 10 can be disposed in any orientation, the following descriptions are based on the assumption that an X direction is a leftward direction, a Y direction is a forward direction, and a Z direction is an upward direction.

(Power Storage Module 10)

Figure 4:
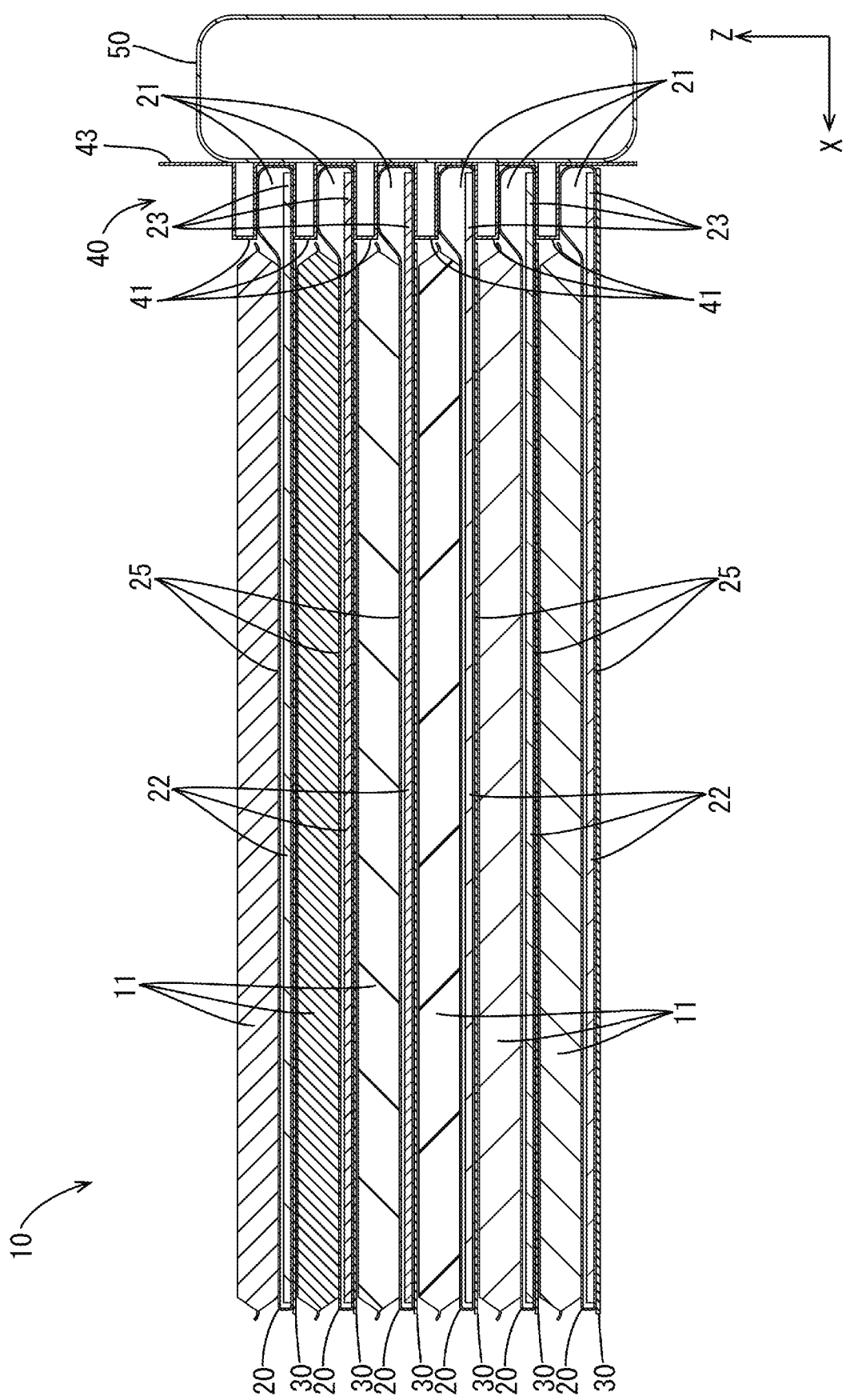
FIG. 4 is a cross-sectional view of FIG. 2 taken along line A-A.

As illustrated in FIG. 4, the power storage module 10 includes: a plurality of (six in the present embodiment) power storage elements 11; a plurality of (six in the present embodiment) cooling members 20 that are stacked on the power storage elements 11 to cool the power storage elements 11; a plurality of (six in the present embodiment) heat equalization plates 30 that are stacked between the cooling members 20 and the power storage elements 11 to receive heat of the cooling members 20 and the power storage elements 11; and a heat transfer member 40 that is disposed between the cooling members 20 and an external heat dissipation member 50 to relay the heat of the cooling members 20 to the external heat dissipation member 50.

(Power Storage Elements 11)

Figure 1:
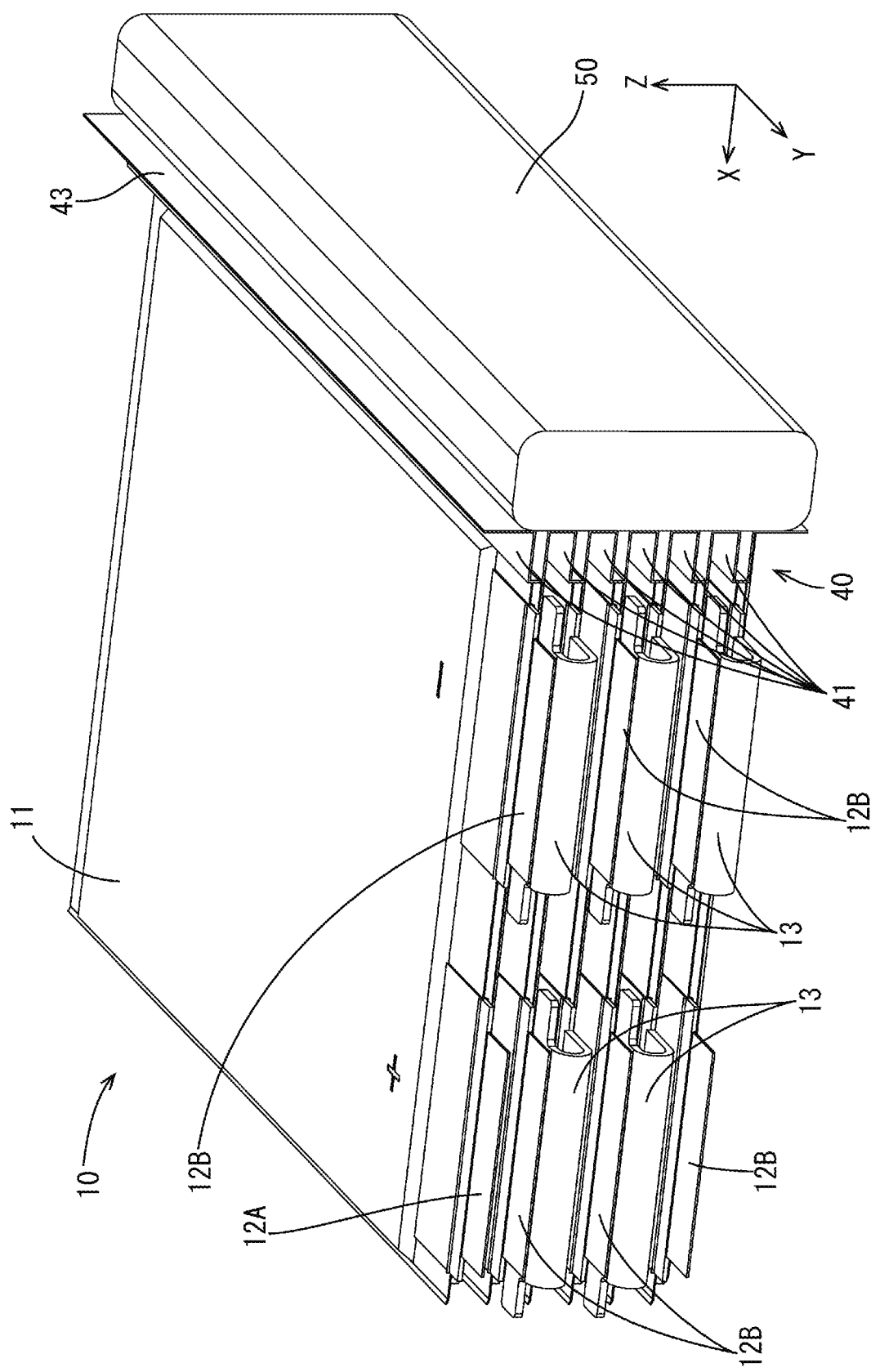
FIG. 1 is a perspective view of a power storage module in a first embodiment.
Figure 2:
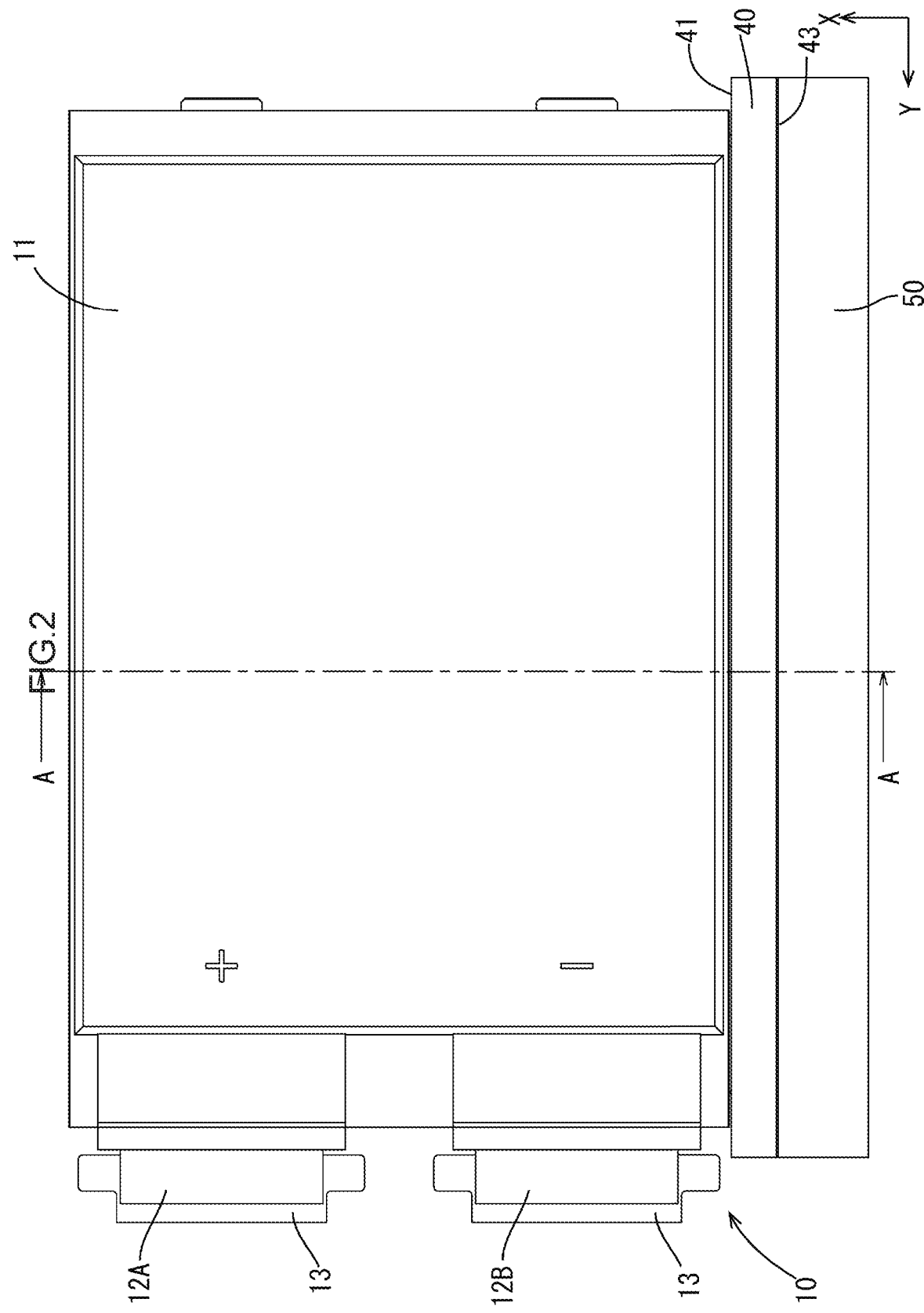
FIG. 2 is a planar view of the power storage module.
Figure 3:
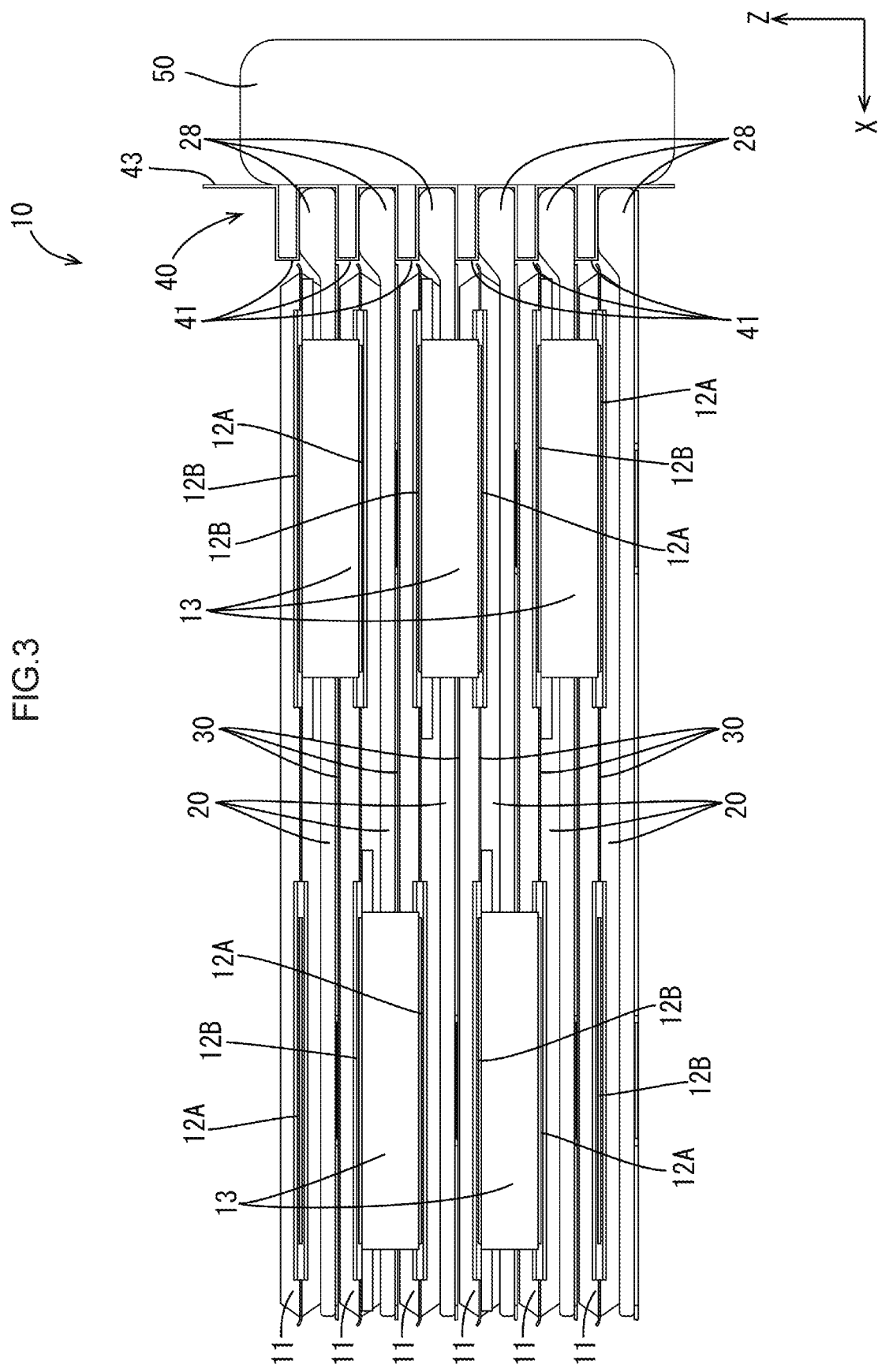
FIG. 3 is a front view of the power storage module.

Each of the power storage elements 11 is formed by sandwiching a power storage factor not illustrated between a pair of battery laminate sheets and bonding side edges of the battery laminate sheets in a liquid-tight manner by a publicly known method such as heat welding. A positive electrode terminal 12A and a negative electrode terminal 12B in metallic foil form protrude from the front end edge of each of the power storage elements 11, from inside to outside of the battery laminate sheets in a liquid-tight state with the inner surface of the battery laminate sheet as illustrated in FIG. 1. The electrode terminal 12A and the electrode terminal 12B of each of the power storage elements 11 are disposed with a space therebetween and are electrically connected to the internal power storage factor.

The plurality of power storage elements 11 are vertically aligned and the adjacent power storage elements 11 are disposed such that one electrode terminal 12A is positioned next to the other electrode terminal 12B. The adjacent electrode terminal 12A and electrode terminal 12B are electrically connected together via a plurality of (five in the present embodiment) U-shaped connection members 13. The electrode terminals 12A, 12B and the connection members 13 are connected together by a publicly known method such as laser welding, ultrasonic welding, or brazing, for example. The adjacent electrode terminals 12A and 12B are connected together by the connection members 13, so that the plurality of power storage elements 11 are connected in series.

In the present embodiment, examples of the power storage elements 11 include secondary batteries such as lithium-ion secondary batteries or nickel-metal-hydride secondary batteries, capacitors such as electric double-layer capacitors or lithium ion capacitors, and any type can be selected as necessary.

(Cooling Members 20)

Figure 6:
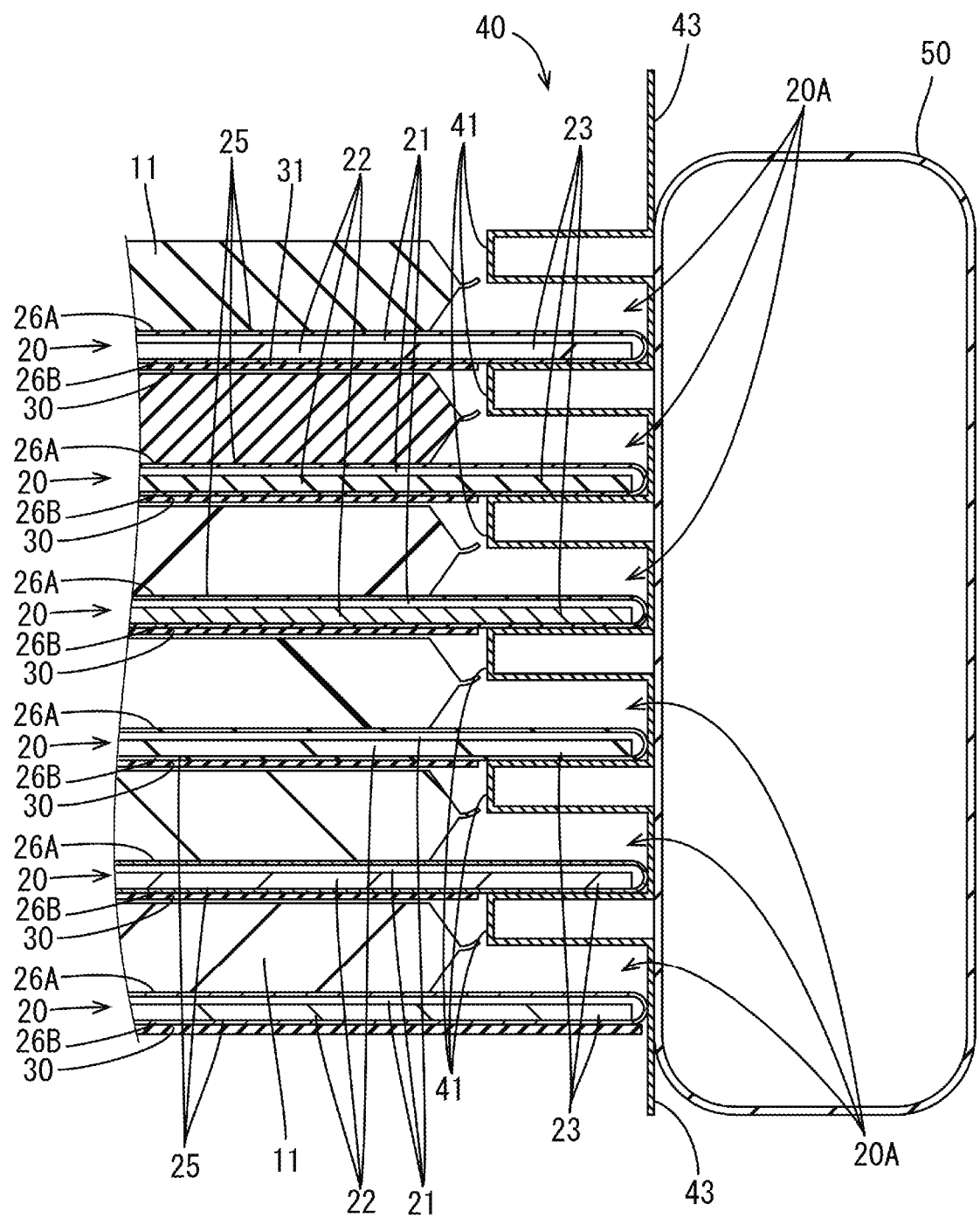
FIG. 6 is a cross-sectional view of FIG. 5 in which a sealing body is not bulged or deformed.
Figure 7:
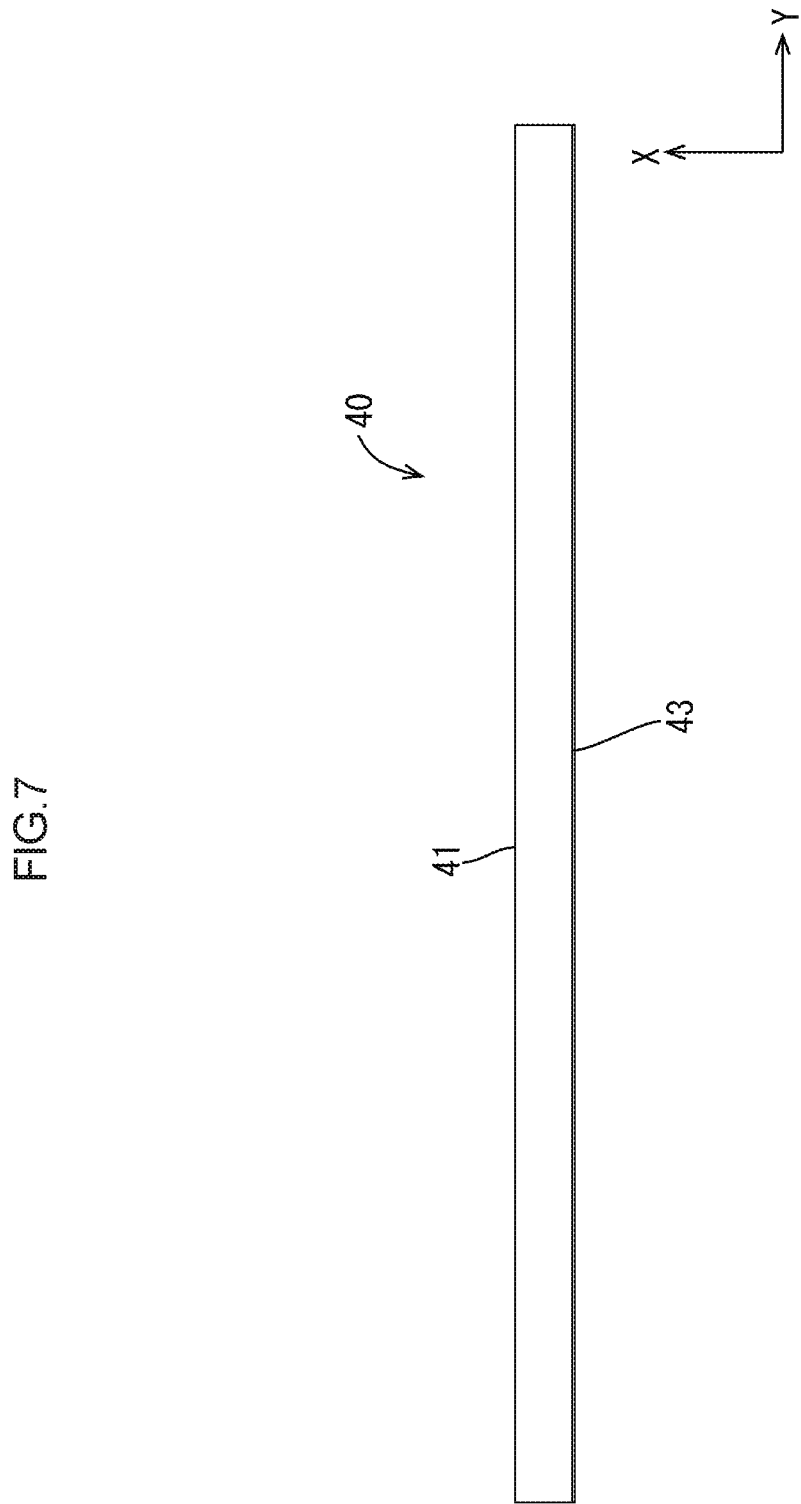
FIG. 7 is a planar view of a heat transfer member.

Each of the cooling members 20 includes a coolant 21 that varies between liquid and gaseous states, an absorption member 22 that absorbs the coolant 21, and a sealing body 25 that hermetically seals the coolant 21 and the absorption member 22, as illustrated in FIG. 6. The coolant 21 can be one or more selected from a group consisting of perfluorocarbon, hydrofluoroether, hydrofluoroketone, fluorine inert liquid, water, and alcohols such as methanol and ethanol, for example. The coolant 21 may have insulating properties or conductive properties. The amount of the coolant 21 sealed in the sealing body 25 can be selected as necessary.

The absorption member 22 has a substantially rectangular sheet shape. The absorption member 22 is formed from a material that can absorb the coolant 21. The absorption member 22 may be formed by processing a material configured to absorb the coolant 21 in fiber form and weaving into a fabric or may be formed from a non-woven fabric. The form of the non-woven fabric may be fiber sheet, web (thin film sheet made of fiber only), or bat (blanket-like fiber). The material for the absorption member 22 may be natural fiber, synthetic fiber formed from synthetic resin, or a combination of natural fiber and synthetic fiber.

The absorption member 22 is disposed in a wide region as compared to the region overlapping the power storage element 11, and thus the absorption member 22 in the sealing body 25 includes an absorption extension portion 23 that is extended from the region overlapping the power storage element 11 to a region not overlapping the power storage element 11.

The sealing body 25 can be formed by bonding together two substantially rectangular sheet members in a liquid-tight manner by a publicly known method such as adhesion, welding, or deposition, for example. Each of the sheet members is formed by laminating a synthetic resin film to the both sides of a metallic sheet. The metal constituting the metallic sheet can be any metal selected from among aluminum, aluminum alloy, copper, and copper alloy as necessary. The synthetic resin constituting a synthetic resin film can be any synthetic resin selected from among polyolefins such as polyethylene and polypropylene, polyesters such as polybutylene terephthalate and polyethylene terephthalate, polyamides such as nylon 6 and nylon 6, 6 as necessary. The sealing body 25 according to the present embodiment is formed by stacking and thermally fusing the surfaces of two sheet members with synthetic resin films.

Figure 5:
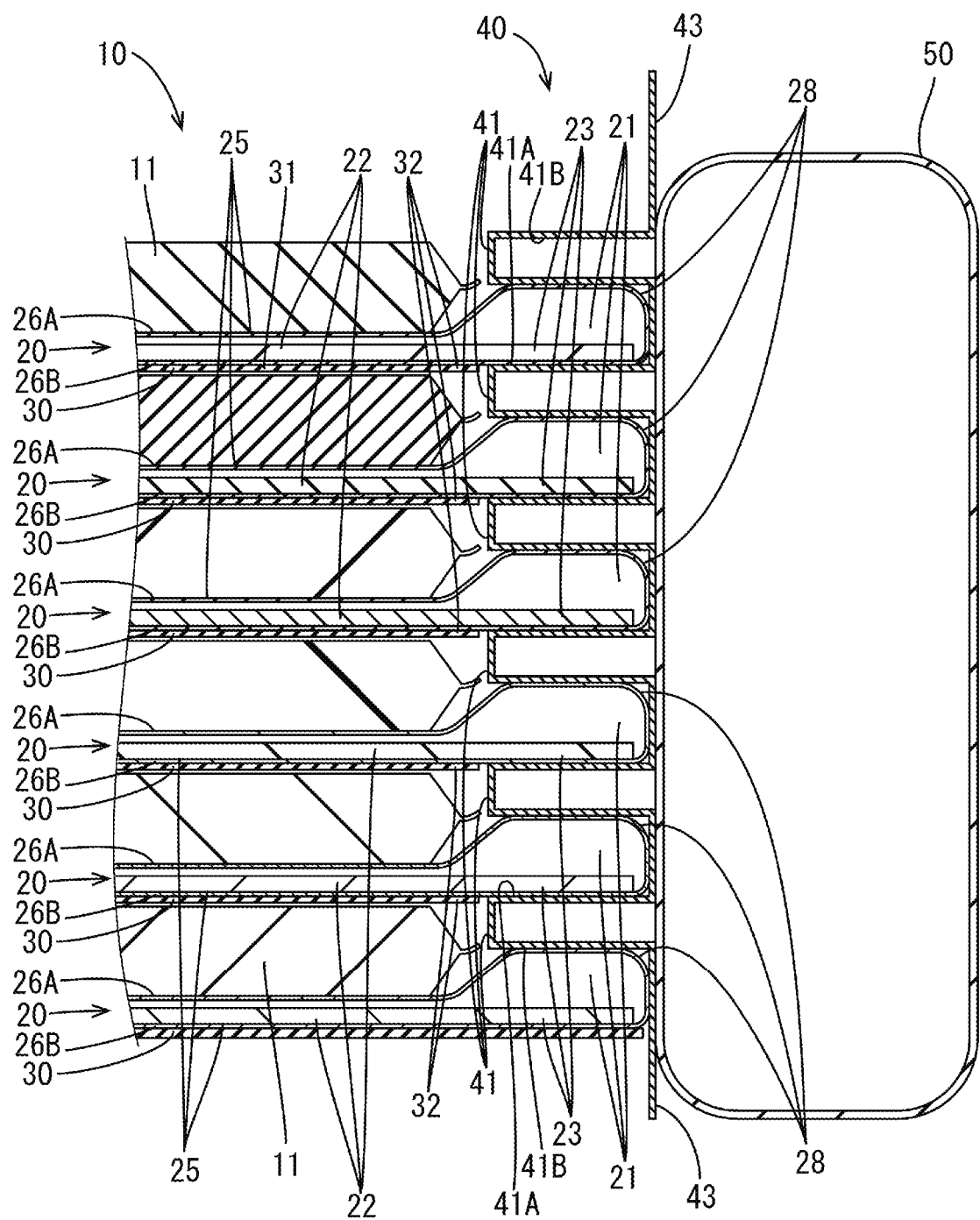
FIG. 5 is a partially enlarged cross-sectional view of FIG. 4.

The sealing body 25 has a first sheet portion 26A to cover the upper side of the absorption member 22 and a second sheet portion 26B to cover the lower side of the absorption member 22 as illustrated in FIG. 6. The upper surface of the first sheet portion 26A is in contact with the lower surface of the power storage element 11 and the lower surface of the second sheet portion 26B is in contact with the upper surface of the heat equalization plate 30. The cooling member 20 has an extension portion 20A extended to a region not overlapping the power storage element 11. The first sheet portion 26A in the extension portion 20A is set as a bulging portion 28 that is configured to bulge and deform by evaporation of the coolant 21 in the sealing body 25 as illustrated in FIG. 5. The bulging portion 28 is formed by bulging and deformation of the sealing body 25 with a rise in the inner pressure caused by evaporation of the coolant 21 at the extension portion 20A of the cooling member 20. The portion of the sealing body 25 other than the bulging portion 28 does not bulge or deform even with a rise in the inner pressure caused by evaporation of the coolant 21 in the sealing body 25 because the portion of the sealing body 25 is sandwiched between the power storage element 11 and the heat equalization plate 30 and is restricted in bulging.

(Heat Equalization Plates 30)

Each of the heat equalization plates 30 is rectangular in shape and stacked on the power storage element 11 with the cooling member 20 therebetween and is formed from a member with high heat conductivity such as aluminum, aluminum alloy, copper, or copper alloy. Each of the heat equalization plates 30 has a contact portion 31 that contacts the power storage element 11 and the second sheet portion 26B to receive heat of the power storage element 11 and a heat equalization extension portion 32 that extends in a region not overlapping the power storage element 11 on the right side of the contact portion 31. In the present embodiment, there is formed a gap between a right end of the heat equalization extension portion 32 and a spacer portion 41 described later of the heat transfer member 40 on the right side. However, the present embodiment is not limited to this configuration, and the end of the heat equalization extension portion 32 and the heat transfer member 40 may be in contact with each other.

(Heat Transfer Member 40)

Figure 8:
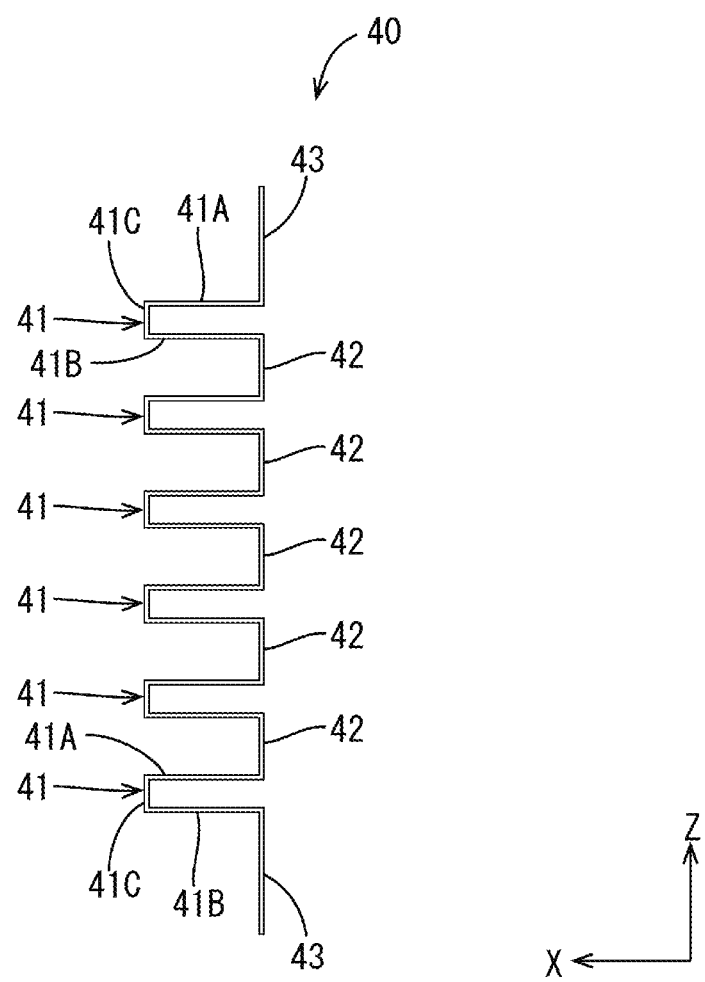
FIG. 8 is a front view of the heat transfer member.

The heat transfer member 40 is formed from a metal with high heat conductivity such as aluminum, aluminum alloy, copper, or copper alloy and is formed to be longer than the length of the cooling member 20 in a front-back direction. As illustrated in FIGS. 8 and 9, the heat transfer member 40 includes a plurality of (six in the present embodiment) spacer portions 41 aligned in one line, a plurality of (five in the present embodiment) coupling portions 42 that couple the adjacent spacer portions 41, and a pair of overhanging portions 43 that hangs over from outer surfaces of the spacer portions 41 at ends in an alignment direction. Each of the spacer portions 41 has a substantially U shape, has a length to be in abutment with the entire cooling member 20 in the front-back direction, and includes a pair of side wall portions 41A and 41B in parallel, and a front end wall 41C that connects between the pair of side wall portions 41A and 41B. As illustrated in FIGS. 5 and 6, the heat transfer member 40 has the spacer portions 41 disposed between the plurality of adjacent extension portions 20A of the plurality of cooling members 20. The one side wall portion 41A of the spacer portion 41 is in abutment with the second sheet portion 26B. When the first sheet portion 26A bulges and deforms by evaporation of the coolant 21 to form the bulging portion 28, the bulging portion 28 deforms and adheres closely to the side wall portion 41B and the coupling portion 42.

(Heat Dissipation Member 50)

The heat dissipation member 50 is disposed on a lateral side of the power storage module 10 to dissipate heat having been transferred to the heat equalization plates 30 to the outside. The heat dissipation member 50 is formed from a metal such as aluminum or aluminum alloy and has an inlet opening and an outlet opening for a cooling material not illustrated. A cooling liquid as a cooling material is introduced into the lower inlet opening and discharged from the upper outlet opening. The cooling liquid circulates through a heat dissipation path not illustrated to dissipate heat having been transferred to the cooling liquid to the outside. The heat dissipation member 50 may have a pipe (not illustrated) for passage of the cooling liquid entirely extending inside with a plurality of folds. In the present embodiment, the cooling liquid is water. However, the cooling liquid is not limited to this, and may be a liquid such as oil. Alternatively, the cooling liquid may be an antifreeze liquid. In addition, the cooling material is not limited to a liquid, and may be a gas.

The present embodiment produces the following operations and advantageous effects.

The power storage module 10 includes: the plurality of power storage elements 11; the plurality of cooling members 20 each of which has the coolant 21 and the sealing body 25 hermetically sealing the coolant 21, is stacked on the power storage element 11, and is configured to form the bulging portion 28 by deformation of the sealing body 25 caused by evaporation of the coolant 21 at the extension portion 20A extending in the region not overlapping the power storage element 11; and the heat transfer member 40 that has the spacer portion 41 disposed between the adjacent extension portions 20A of the plurality of cooling members 20 and configured to abut with the bulging portion 28.

According to the present embodiment, it is possible to dissipate heat from the power storage elements 11 via the cooling members 20 in which the coolant 21 is sealed in the sealing body 25 and the heat transfer member 40. Accordingly, as compared to the configuration in which the coolant 21 is charged in a case where the power storage elements 11 are stored, for example, the case does not necessarily need to be sealed. This makes it possible to simplify the configuration of the power storage module 10. When the bulging portion 28 formed by the bulging and deformation of the sealing body 25 in the cooling member 20 is disposed in a space with low heat conductivity (air), there is caused a problem of poor heat dissipation property of the bulging portion 28.

In addition, according to the present embodiment, the spacer portion 41 disposed between the adjacent extension portions 20A of the plurality of cooling members 20 abuts with the bulging portion 28, and thus the heat of the power storage elements 11 is transmitted from the cooling members 20 to the heat transfer member 40 to allow heat dissipation to the outside via the heat transfer member 40, thereby achieving improvement in heat dissipation property.

The heat transfer member 40 has the plurality of spacer portions 41 aligned, and the bulging portion 28 is disposed between the adjacent spacer portions 41.

Accordingly, the bulging portion 28 easily adheres to the spacer portions 41, thereby to improve heat conductivity between the cooling member 20 and the heat transfer member 40.

Out of the plurality of spacer portions 41, the spacer portions 41 at ends in the alignment direction have the overhanging portions 43 hanging over outward on outer surfaces thereof.

This allows heat dissipation via the overhanging portions 43 of the heat transfer member 40, thereby to improve heat dissipation property.

The heat transfer member 40 includes the coupling portion 42 that couples the plurality of spacer portions 41, and surface of the coupling portion 42 contacts a surface of the external heat dissipation member 50.

Accordingly, it is possible to improve heat conductivity from the heat transfer member 40 to the heat dissipation member, thereby to improve heat dissipation property.

The power storage module 10 further includes the heat equalization plate 30 that is stacked on the power storage element 11 with the cooling member 20 therebetween. The heat equalization plate 30 includes the heat equalization extension portion 32 that is extended to the heat transfer member 40 side in the region not overlapping the power storage element 11 but overlapping the cooling member 20.

Accordingly, the heat conductivity to the heat transfer member 40 can be improved by the heat equalization extension portion 32 of the heat equalization plate 30.

OTHER EMBODIMENTS

The technique described herein is not limited to the embodiments described above and illustrated in the drawings. For example, the following embodiments are included in the scope of the technique described herein:

(1) The heat transfer member 40 includes the overhanging portions 43. However, the heat transfer member 40 may not include the overhanging portions 43.

(2) The bulging portion 28 is configured to contact (closely adheres to) substantially the entire side wall portion 41A and the left surface of the main body 21. However, the bulging portion 28 is not limited to this. At least part of the bulging portion 28 may be configured to abut with at least one of the side wall portion 41A and the main body 21.

(3) The bulging portion 28 is formed at the first sheet portion 26A. Alternatively, the bulging portion 28 may be formed at both the first sheet portion 26A and the second sheet portion 26B. In this case, the bulging portions 28 may be in abutment with both the side wall portions 41A and 41B of the spacer portion 41.

(4) The numbers of the power storage elements 11, the cooling members 20, and the heat equalization plates 30 are not limited to the numbers in the foregoing embodiments, and can be changed as appropriate. The numbers of the spacer portions 41 and the coupling portions 42 of the heat transfer member 40 can also be changed as appropriate according to the number of the cooling members 20 or the like.

(5) The power storage module 10 may not include the heat dissipation member 50. For example, the power storage module 10 may be covered with a metallic or synthetic resin case not illustrated, so that the heat of the power storage module 10 is dissipated via the case to the outside without the intervention of the heat dissipation member 50. In addition, the case may be a part of the heat dissipation member 50, or the case may cover the entire power storage module 10 including the heat dissipation member 50, for example. In this case, for example, the case may sandwich the power storage module 10 from the upper and lower sides to hold the power storage module 10.

EXPLANATION OF SYMBOLS

10: Power storage module
11: Power storage element
20: Cooling member
20A: Extension portion
21: Coolant
22: Absorption member
25: Sealing body
28: Bulging portion
30: Heat equalization plate
40: Heat transfer member
41: Spacer portion
43: Overhanging portion
50: Heat dissipation member

The invention claimed is:

1. A power storage module comprising:
power storage elements;
cooling members arranged with the power storage elements,
wherein each of the cooling members has a coolant and a sealing body hermetically sealing the coolant, each of the cooling members being stacked on a corresponding one of the power storage elements, and each of the cooling members being configured to form a bulging portion by deformation of the sealing body caused by evaporation of the coolant at an extension portion of each of the cooling members extending in a region not overlapping the power storage elements; and
a heat transfer member having spacer portions, wherein each of the spacer portions is disposed between adjacent extension portions of adjacent ones of the cooling members, and wherein each of the spacer portions is configured to abut the bulging portion of the corresponding one of the cooling members;
wherein
the spacer portions are aligned, and
the bulging portion of the corresponding one of the cooling members is disposed between adjacent ones of the spacer portions,
wherein
the heat transfer member includes a coupling portion that couples the spacer portions, and
a surface of the coupling portion contacts a surface of an external heat dissipation member; and
heat equalization plates arranged with the power storage elements, wherein each of the heat equalization plates is stacked on the corresponding one of the power storage elements with the corresponding one of the cooling members positioned therebetween, wherein
each of the heat equalization plates includes a heat equalization extension portion that extends toward the heat transfer member, wherein the heat equalization extension portion is provided in the region not overlapping the power storage elements.

2. The power storage module according to claim 1, wherein the extension portion of each of the cooling members extends farther in a direction toward the heat transfer member than a corresponding heat equalization extension portion.

3. The power storage module according to claim 1, wherein the heat equalization extension portion of each of the heat equalization plates is positioned outside of a region in which the extension portion of each of the cooling members and the corresponding one of the spacer portions overlap.

4. The power storage module according to claim 1, wherein, among the spacer portions, end spacer portions, which are provided at ends of the heat transfer member in an alignment direction, have overhanging portions, and
wherein each of the overhanging portions extends outwardly from an outer surface of a corresponding one of the end spacer portions.

* * * * *